United States Patent
Clos et al.

(10) Patent No.: US 7,086,517 B2
(45) Date of Patent: Aug. 8, 2006

(54) CARGO SYSTEM ROLLER/LOCK/POWER DRIVE UNIT TRAY INTEGRATION

(75) Inventors: William R. Clos, Mukilteo, WA (US); Karen S. Whitaker, Arlington, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/976,724

(22) Filed: Oct. 29, 2004

(65) Prior Publication Data

US 2006/0090981 A1   May 4, 2006

(51) Int. Cl.
*B65G 13/11* (2006.01)
(52) U.S. Cl. .................. 193/35 R; 198/860.1; 414/536
(58) Field of Classification Search ............. 198/860.1; 193/35 R; 414/529, 536
See application file for complete search history.

(56) References Cited

U.S. PATENT DOCUMENTS

| | | | | |
|---|---|---|---|---|
| 1,826,832 A | * | 10/1931 | Sekulski | 198/448 |
| 3,589,490 A | * | 6/1971 | Walkhoff et al. | 193/35 R |
| 3,915,275 A | * | 10/1975 | Specht | 193/35 R |
| 4,239,100 A | * | 12/1980 | Corey | 193/35 R |
| 5,350,048 A | * | 9/1994 | Wylie | 193/35 A |
| 5,927,650 A | * | 7/1999 | Huber | 244/118.1 |
| 6,051,133 A | * | 4/2000 | Huber et al. | 210/171 |
| 6,517,028 B1 | * | 2/2003 | Huber | 244/137.1 |
| 2001/0045339 A1 | * | 11/2001 | Esser et al. | 193/35 R |
| 2004/0211649 A1 | * | 10/2004 | Bonifer et al. | 198/804 |
| 2005/0023105 A1 | * | 2/2005 | Costanzo et al. | 193/35 MD |

FOREIGN PATENT DOCUMENTS

| | | |
|---|---|---|
| EP | 1 415 908 A | 5/2004 |
| FR | 1 390 447 A | 2/1965 |

* cited by examiner

*Primary Examiner*—Gene O'Crawford
*Assistant Examiner*—Mark A. Deuble
(74) *Attorney, Agent, or Firm*—Ingrassia Fisher & Lorenz, P.C.

(57) ABSTRACT

An apparatus is provided for housing cargo-moving devices in a cargo handling system. The apparatus comprises a variable width tray having a wide section, a narrow section, and a transition section for connecting the narrow section to the wide section. The narrow section is configured to house narrow cargo-moving devices such as rollers and lock/stops, while the wide section is configured to house wide cargo-moving devices such as power drive units. The variable width tray can be further configured to mount within a transport vehicle such as a commercial aircraft.

25 Claims, 2 Drawing Sheets

END VIEW OF TRAY

END VIEW OF TRAY

CARGO SYSTEM ROLLER/LOCK/POWER DRIVE UNIT TRAY INTEGRATION

TECHNICAL FIELD

The present invention generally relates to cargo handling systems, and more particularly relates to the integration of rollers, locks and power drive units into trays within a cargo handling system.

BACKGROUND

Cargo handling systems are typically used for moving palletized and/or containerized cargo into and out of cargo compartments in transport vehicles such as commercial aircraft, as well as others. The structure of a cargo handling system typically includes channels, herein designated as "trays", that are generally oriented in the fore/aft direction of the transport vehicle. Presently, trays are created in various dimensions to accommodate different shipping needs. A relatively narrow tray structure, for example, typically provides the mounting enclosure for correspondingly narrow cargo-moving devices (e.g., rollers and locks/stops), and can offer the benefits of reduced weight and lower cost as compared to a wider tray structure which is typically used for correspondingly wider cargo-moving devices.

A relatively narrow tray structure, however, may not be wide enough to accommodate current-technology power drive units that are the electromechanical actuators used to drive and to brake cargo pallets and containers. As such, a relatively narrow type of tray structure is often configured with power drive units that are supported by an additional dedicated structure within the transport vehicle, and this added structure can be disadvantageous with respect to cost and weight considerations. Alternatively, a wider tray structure with correspondingly wider cargo-moving devices is generally capable of directly housing current-technology power drive units, but the wider tray structure is typically heavier than the narrower tray structure. Therefore, the utilization of conventional tray structures (narrow or wide) typically represents a compromise in cargo handling system cost and weight considerations.

Accordingly, it is desirable to provide a cargo handling system tray structure that combines the advantages of both the narrow and the wide tray designs while minimizing their traditional disadvantages. In addition, it is desirable to provide a cargo handling system tray structure that is relatively simple and economical to manufacture. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, a tray structure is provided for housing cargo-moving devices in a cargo handling system. One embodiment comprises a variable width tray having a wide section, a narrow section, and a transition section for connecting the narrow section to the wide section. The narrow section is configured to house narrow cargo-moving devices such as rollers and lock/stops, while the wide section is configured to house wide cargo-moving devices such as power drive units. The variable width tray can be further configured to mount within a transport vehicle such as a commercial aircraft.

The narrow section of the exemplary variable width tray is typically configured with an internal width of 2.62 inches to be compatible with existing standard narrow cargo-moving devices. The wide section of the exemplary variable width tray is typically configured with an internal width compatible with industry usage, including a commonly used width of 3.937 inches. In addition, it will be appreciated that the exemplary variable width tray can be configured with other narrow and wide internal widths in order to accommodate different sizes of cargo-moving devices in accordance with a particular application.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of cargo handling system trays that are typically used to house the various cargo-moving devices, such as rollers, ball transfer units, locks/stops, power drive units, braking rollers, and so forth. Moreover, cargo handling systems for the commercial aircraft industry have traditionally incorporated trays with standardized internal widths, including a "narrow" 2.62 inch width, and a "wide" 3.937 inch width, among others, and there is generally a significant inventory of cargo-moving devices that will fit these basic tray widths.

Conventional narrow (e.g., 2.62 inches) trays have generally been configured to house correspondingly narrow cargo-moving devices, but can generally not accommodate the relatively wide current-technology power drive units without an added support fixture, thereby increasing the weight and complexity of the overall narrow tray structure. Conventional wide (e.g., 3.937 inches) trays are typically designed to house correspondingly wide cargo-moving devices, including current-technology power drive units, but the wide trays and wide cargo-moving devices are generally heavier than the narrow tray structures. In an exemplary embodiment to be described below, a variable width tray configuration combines the desirable features of both narrow and wide trays in an optimally integrated structure.

Figure 1:
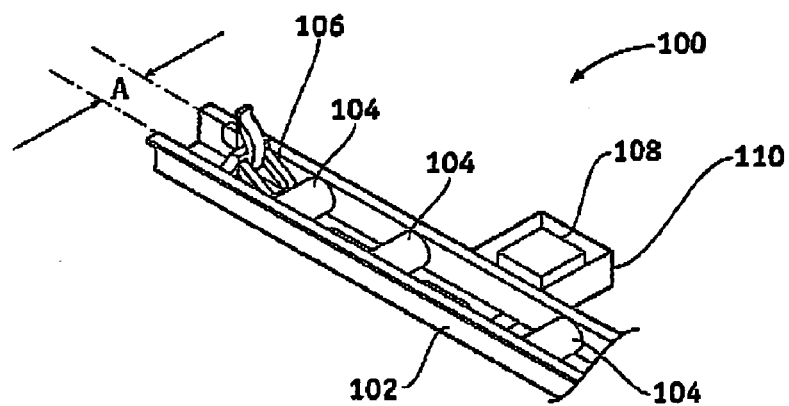
FIG. 1 is an illustration of a conventional narrow tray structure for a cargo handling system.

A typical narrow tray structure 100 is illustrated in the simplified drawing of FIG. 1. In this conventional narrow configuration, a tray 102 is typically standardized to an internal width A on the order of 2.62 inches. Within tray 102 are typically mounted correspondingly narrow cargo devices such as rollers 104 and lock/stop 106. As noted previously, current-technology power drive units (hereinafter designated as "PDUs") are generally too wide to fit inside a standard narrow tray. Therefore, as shown in FIG. 1, a PDU 108 is typically mounted in some type of dedicated structure 110 that is external to tray 102. As such, structure 110 represents an additional weight for the transport vehicle, and an additional cost to install and maintain.

Figure 2:
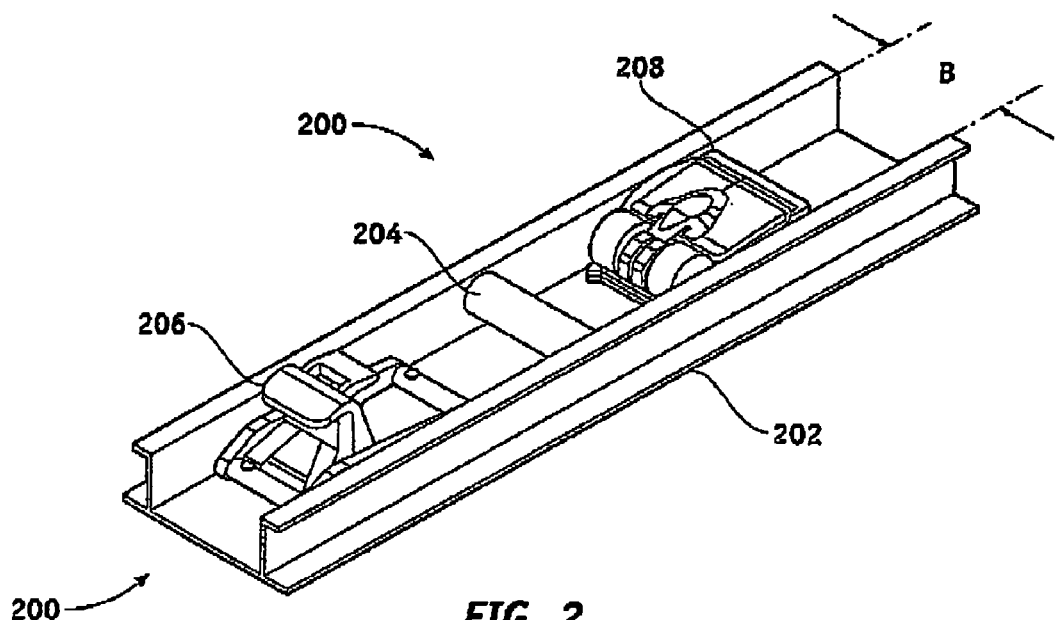
FIG. 2 is an illustration of a conventional wide tray structure for a cargo handling system.

The conventional alternative to narrow tray structure 100 is a wide tray structure 200, as illustrated in the simplified drawing of FIG. 2. In this conventional wide configuration, a tray 202 is typically standardized to current industry usage, such as an internal width B of 3.937 inches. Tray 202 is generally wide enough to accommodate not only correspondingly wide cargo devices such as a roller 204 and a lock/stop 206, but also a current-technology PDU 208. As such, a dedicated external structure is generally not required for housing PDU 208, but the additional weight of wide tray 202 and wide cargo devices 204, 206, as compared to the weight of narrow tray 102 with narrow cargo devices 104, 106, is still disadvantageous for a transport vehicle.

Figure 3:
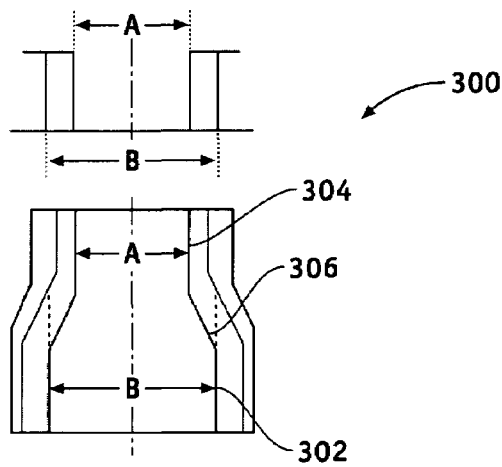
FIG. 3 is an illustration of an exemplary embodiment of a variable width tray.

In order to overcome the disadvantages of both the conventional narrow tray structure 100 and the conventional wide tray structure 200, a variable width tray configuration is depicted in FIG. 3. According to an exemplary embodiment of a variable width tray 300, a wide portion 302 is connected to a narrow portion 304 by a transition section 306. The narrow internal width A can be configured as the traditional standard width of 2.62 inches, and the wide internal width B can be configured as the traditional standard width of 3.937 inches or in accordance with other standard industry widths. It will be appreciated that these dimensions are merely exemplary, however, and other equivalent internal tray widths A and B can also be configured for other standard or non-standard widths in order to be compatible with different types of cargo devices, including PDUs.

Figure 4:
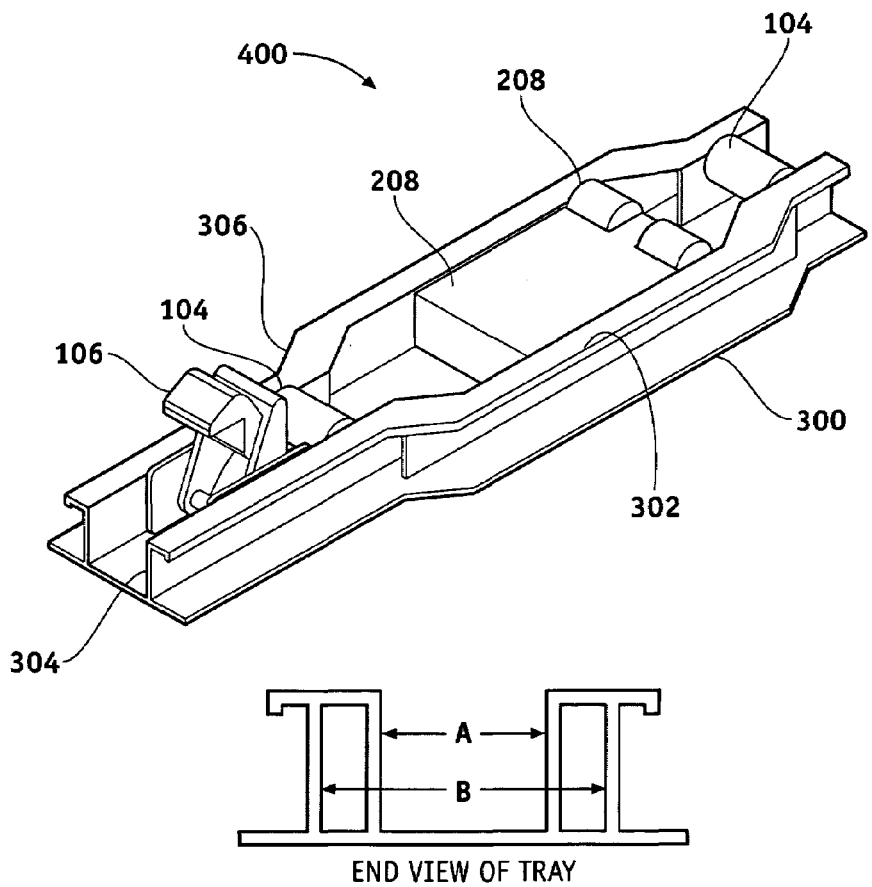
FIG. 4 is an illustration of an exemplary embodiment of a variable width tray structure housing cargo-moving devices.

An exemplary embodiment of a variable width tray structure 400 is illustrated in simplified form in FIG. 4. An exemplary variable width tray 300 is configured with a wide portion 302, a narrow portion 304, and a transition portion 306 that integrates wide portion 302 with narrow portion 304. In this exemplary embodiment, wide portion 302 houses wide devices such as PDU 208, and narrow portion 304 houses narrow devices such as rollers 104 and lock/stop 106. As such, narrow cargo devices 104, 106 housed in narrow tray portion 304 minimize tray and cargo device weight, while PDU 208 is housed in wide tray portion 302 to preclude the need for a dedicated external mounting structure.

Accordingly, the shortcomings of the prior art have been overcome by providing an improved cargo-handling tray configuration. A variable width tray incorporates a narrow portion to house relatively lightweight narrow cargo devices and also incorporates a wide portion to house wider devices such as a PDU. In this manner, the overall weight of the variable width tray structure can be reduced from that of either a conventional narrow tray with an external PDU mounting structure or a conventional wide tray with correspondingly wide cargo devices.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A variable width tray for housing cargo-moving devices, comprising:
    an elongated first portion of the variable width tray having a base and two substantially opposed upstanding sides, wherein the first portion has a first internal width that is substantially constant along a central axis;
    an elongated second portion of the variable width tray having a base and two substantially opposed upstanding sides, wherein the second portion has a second internal width that is substantially constant along said central axis, and wherein the second internal width is greater than the first internal width; and
    a transition section disposed between the first portion and the second portion, wherein the transition section has a base that is contiguous with the base of the first portion and the base of the second portion and two upstanding sides that are contiguous with the upstanding sides of the first portion and the second portion.

2. The variable width tray of claim 1 wherein the first portion and second portion of the variable width tray are configured to house cargo-moving devices.

3. The variable width tray of claim 1, wherein the first internal width is 2.62 inches.

4. The variable width tray of claim 1, wherein the second internal width of the second portion is 3.937 inches.

5. The variable width tray of claim 1 wherein the first portion, the second portion and the transition section are fabricated by an extrusion process.

6. The variable width tray of claim 1 wherein the first portion, the second portion and the transition section are configured by a machining process.

7. The variable width tray of claim 2 wherein the cargo-moving devices comprise rollers.

8. The variable width tray of claim 2 wherein the cargo-moving devices comprise ball transfer units.

9. The variable width tray of claim 2 wherein the cargo-moving devices comprise locks/stops.

10. The variable width tray of claim 2 wherein the cargo-moving devices comprise braking rollers.

11. The variable width tray of claim 2 wherein the wide cargo-moving devices comprise power drive units.

12. The variable width tray of claim 1 further comprising mounting devices for installation within a transport vehicle.

13. The variable width tray of claim 12 wherein the transport vehicle is a commercial aircraft.

14. A cargo handling system, comprising:
    a variable width tray having a base and two substantially upstanding sides, wherein a first portion of the variable width tray has a first internal width that is substantially constant along a central axis, a second portion of the variable width tray has a second internal width that is substantially constant along the central axis and is wider than the first internal width, and a transition portion connects the first portion and the second portion;
    at least one narrow cargo-moving device housed in the first portion of the variable width tray; and
    at least one wide cargo-moving device housed in the second portion of the variable width tray.

15. The cargo handling system of claim 14, wherein the first internal width of the first portion is 2.62 inches.

16. The cargo handling system of claim 14, wherein the second internal width of the second portion is 3.937 inches.

17. The cargo handling system of claim 14 wherein the at least one narrow cargo-moving device comprises a roller.

18. The cargo handling system of claim 14 wherein the at least one narrow cargo-moving device comprises a ball transfer unit.

19. The cargo handling system of claim 14 wherein the at least one narrow cargo-moving device comprises a lock/stop.

20. The cargo handling system of claim 14 wherein the at least one narrow cargo-moving device comprises a braking roller.

21. The cargo handling system of claim 14 wherein the at least one wide cargo-moving device comprises a power drive unit.

22. The cargo handling system of claim 14 further comprising mounting devices for installation within a transport vehicle.

23. The cargo handling system of claim 22 wherein the transport vehicle is a commercial aircraft.

24. A variable width tray for housing cargo-moving devices, comprising:

an elongated first portion of the variable width tray having a base and two substantially opposed upstanding sides, wherein the first portion has a first standard internal width of 2.62 inches;

an elongated second portion of the variable width tray having a base and two substantially opposed upstanding sides, wherein the second portion has a second standard internal width of 3.937 inches; and a transition section disposed between the first portion and the second portion, wherein the transition section has a base that is contiguous with the base of the first portion and the base of the second portion and two upstanding sides that are contiguous with the upstanding sides of the first portion and the second portion.

25. A cargo handling system, comprising:

a variable width tray having a base and two substantially upstanding sides, wherein a first portion of the variable width tray has a first standard internal width of 2.62 inches, a second portion of the variable width tray has a second standard internal width of 3.937 inches and a transition portion connects the first portion and the second portion;

at least one narrow cargo-moving device housed in the first portion of the variable width tray; and at least one wide cargo-moving device housed in the second portion of the variable width tray.

* * * * *